Oct. 23, 1934.   J. G. L. SKAR ET AL   1,978,174
BOOKSTACK AND ANALOGOUS STRUCTURE
Filed Sept. 23, 1931   2 Sheets-Sheet 1
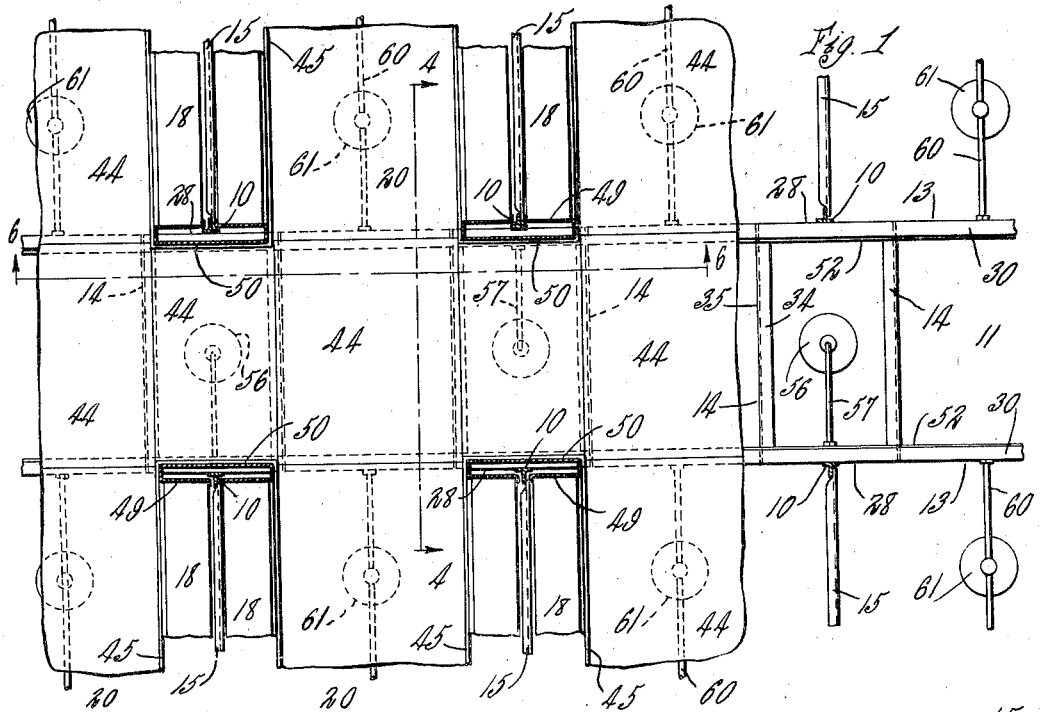

Oct. 23, 1934.　　J. G. L. SKAR ET AL　　1,978,174
BOOKSTACK AND ANALOGOUS STRUCTURE
Filed Sept. 23, 1931　　2 Sheets-Sheet 2
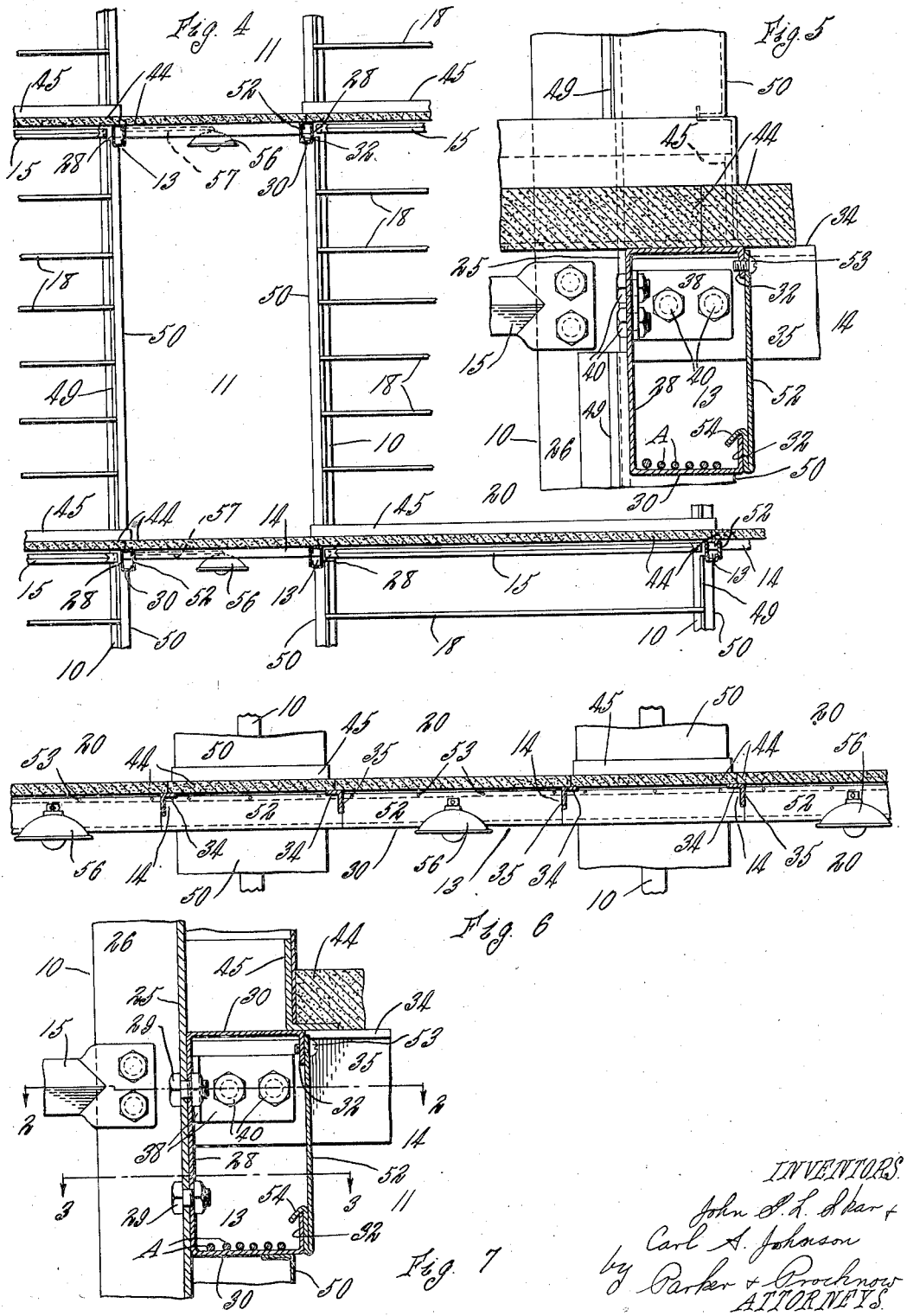

Patented Oct. 23, 1934

1,978,174

UNITED STATES PATENT OFFICE 1,978,174

BOOKSTACK AND ANALOGOUS STRUCTURE

John G. L. Skar and Carl A. Johnson, Jamestown, N. Y., assignors to Art Metal Construction Company, Jamestown, N. Y.

Application September 23, 1931, Serial No. 564,545

8 Claims. (Cl. 189—34)

This invention relates to improvements in metallic bookstacks, shelving and analogous structures of the sort which usually comprise a skeleton framework made up of spaced upright supporting columns arranged in rows and connected by lengthwise and crosswise ties or members at different elevations ordinarily defining the various floors or tiers of the stack.

The framework is so formed as to provide main aisles and lateral aisles extending crosswise thereof, with the shelving arranged between and lengthwise of the latter. Flooring is supported upon the lengthwise and crosswise members, and in order to provide illumination for the structure, some forms of bookstacks have been provided with exposed conduits or the like, for electrical conductors extending along the main aisles, and from which other conduits extend to the lateral aisles.

These exposed conduits mar the appearance of the structure more or less, and the cost of adding them to the structure amounts to a considerable item.

The objects of the present invention are to construct a bookstack or analogous structure provided with hollow, horizontal members which connect the stack columns and act in the double capacity of load supporting or stress sustaining elements of the structure in the place of certain of the structural members heretofore ordinarily used, and also serve the purpose of conduits in which electrical conductors and the like may be housed and concealed; also to provide a stack structure of this sort with hollow conduit members which extend lengthwise of the aisles in the several tiers of the structure and function as floor supporting elements; also to provide hollow members of this sort of improved construction having removable side covers which permit electrical conductors or the like to be readily laid in the hollow members through the open sides thereof, thereby avoiding the inconvenience of pulling the conductors through the conduits, with possible injury thereof; also to provide hollow conduit members upon which lighting fixtures and the like may be supported; and also to improve structures of the sort described in the other respects hereinafter set forth in the claims.

In the accompanying drawings:

Fig. 1 is a plan view, partly in section, of a metallic bookstack structure illustrating a practical embodiment of our invention.

Fig. 2 is a horizontal section thereof on an enlarged scale, taken through one of the structural conduit members of the stack, on line 2—2, Fig. 7.

Fig. 3 is a similar view, on a reduced scale, on line 3—3, Fig. 7.

Fig. 4 is a fragmentary, sectional elevation of the structure showing a portion of two tiers of floors thereof, on line 4—4, Fig. 1.

Fig. 5 is a vertical cross section of one of the hollow members and adjacent parts of the stack, on line 5—5, Fig. 2.

Fig. 6 is a vertical section, taken lengthwise, of a main aisle, on line 6—6, Fig. 1.

Fig. 7 is a vertical section of the stack on line 7—7, Fig. 2.

The bookstack illustrated in the drawings includes rows of spaced upright columns or members 10, the rows being preferably arranged in pairs defining the main aisles 11 of the structure. These uprights are connected in one direction, in accordance with the invention, by hollow, horizontal, combined structural and conduit members 13 which extend lengthwise of the main aisle along the rows of uprights 10 and are rigidly secured to the latter. Extending across the aisles 11 are horizontal connecting or tie members 14 having their ends secured to the hollow members 13, and extending between the aisles are other horizontal connecting members 15, the ends of which are preferably secured to the uprights 10. In this manner a skeleton frame for the stack or structure is provided.

The structure, as usual, is constructed to provide a number of superposed tiers or stories, and these are defined by the horizontal members 13, 14 and 15, which extend directly beneath the flooring of the stack.

A series of shelves or other supports 18 for the books or other objects extends crosswise relative to the main aisles 11, from one to another thereof, preferably from upright to upright, and between and running parallel with said shelving are lateral aisles or passageways 20 communicating with the main aisle 11. The flooring extends along the main and lateral aisles to permit access to the shelving 18.

The uprights 10 may be of any usual or suitable construction adapting them for the purpose. Those illustrated consist of T-bars having their oppositely projecting flanges 25 extending lengthwise of the main aisles and their webs 26 disposed parallel with the lateral aisles. The ends of the connecting members 15 are preferably rigidly secured directly to these webs 26 by suitable bolts or other fastenings.

Each of the hollow, structural, conduit members 13 is preferably in the form of a metal channel arranged with its web 28 vertically against the flanges 25 of the uprights 10, and rigidly secured thereto by suitable fasteners, such as bolts 29, and with the flanges 30 of said channel extending horizontally away from the uprights 10 into the aisles 11. Preferably the top and bottom flanges 30 of the channels 13 terminate respectively in downwardly and upwardly extending edge portions 32.

The connecting or tie members 14 before mentioned may be in the form of angle bars each having a horizontal top flange 34 and a vertical depending flange 35. These members 14 are preferably arranged at the corners or intersections of the main and lateral aisles and are rigidly secured to the hollow members 13, as by cutting away a portion of their top flanges 34 at each end of each member 14 and extending the remaining end portion of the vertical flange 35 into the adjacent, hollow member directly underneath the top flange 30 thereof with its end abutting against the vertical web 28 of said hollow member 13 and the end edges of the horizontal flange 34 engaging the upper edge portion 32 of said member 13, see Figs. 2 and 7. The connecting members 14 may be suitably secured to the members 13 by angle brackets 38 arranged at opposite sides of the vertical flange 35 of each member 14 and secured thereto and to the adjacent web 28 of the member 13 by bolts 40 or otherwise. The depending edge portion 32 of the channel member 13 may be notched to permit the insertion of the end of the flange 35 of the member 14.

The depth of the members 13 between their flanges 30 is considerably greater than that of the flanges 35 of the members 14 so that a continuous conduit or passage is provided extending lengthwise in the members 13 below the members 14.

By the construction described, the top faces of the connecting members 14 are disposed flush with the corresponding faces of the channels 13, thereby forming suitable supporting surfaces upon which the flooring may rest.

The flooring may be of any suitable construction, that shown in the illustration comprising slabs or plates 44 of stone or other material interposed between horizontal, angular, curb members 45. The latter are arranged with their vertical flanges at the edges of the slabs 44 and their horizontal flanges extending beneath the same and resting in part upon the top faces of the connecting members 14, and in part upon the top faces of the hollow members 13, depending upon the direction in which the flooring extends.

In the bookstack construction illustrated, the sets of shelves 18 are provided with end uprights 49 including upright finishing plates or panels 50 which project into the main aisles in spaced parallel relation to the flanges 25 of the uprights 10, and terminate at their lower edges adjacent the curbs 45. The upper ends of said panels meet the horizontal, lower flanges 30 of the hollow members 13, see Figs. 4 and 7.

Preferably the open sides of the hollow or channel members 13 are closed by removable covers 52 which may be in the form of sheet metal plates arranged vertically with their upper edges detachably secured to the depending edge portion 32 of a member 13 by screws or the like 53, and which are provided at their lower edges with horizontal hook portions 54 engaging over the vertical edge portion 32 of the lower flange 30 of said member. The hook portions 54 of the cover plates 52 may be formed by bending the lower portions of said plates upwardly and then outwardly at an angle, as shown clearly in Fig. 7.

These cover plates 52 are formed in sections, preferably of such length that they extend from one to another of the connecting members 14, and preferably said plates have their ends cut away as shown in Fig. 6, so as to fit around the flanges of said members 14 so as to avoid gaps between the ends of said cover plates.

It will be seen by the foregoing description that the necessary wires, conductors or the like A for carrying the electric current for illuminating the aisles of the stack can be readily laid in and supported by the hollow, structural members 13, after which the cover plates 52 can be applied.

The lighting fixtures for the main aisles may be arranged centrally thereof, as shown at 56, being supported in this position at the outer ends of horizontal pipes or brackets 57 rigidly secured at their other ends in holes in the removable cover plates 52. In this manner the lighting fixtures 56 can be attached to the cover plates and the conductors connected to the terminals of the fixtures before the cover plates are secured in place.

For illuminating the lateral aisles, suitable pipes or conduits 60 are provided which extend lengthwise and preferably centrally of said aisles beneath the flooring, with their ends detachably fixed in holes in the upright webs 28 of the hollow members 13. In this manner the conductors for the lateral aisles can also be laid in the hollow members 13 and carried therefrom into said lateral conduits 60 so that all of the wiring for the stack is concealed.

Lighting fixtures 61 may be directly secured to the conduits or pipes 60, as shown, to provide the necessary illumination of the shelves or supports 18.

By the construction herein described, bookstacks and the like structures may be produced at a considerable saving in cost, since the hollow members 13 act in the combined capacity of structural or load supporting members for connecting the uprights of the skeleton frame of the stack and also as conduits or passages for supporting and leading the electric wires or conductors to the various aisles. The members 13 are located along the sides of the aisles and project only slightly into the aisles below the ceilings, and do not appreciably mar the appearance of the structure. Also, the attaching means for securing the cross ties or members 14 to the hollow members 13 are concealed within the latter. Further, by using the members 13 in part as supports for the flooring, other supports are not needed for this purpose at the ends of the lateral aisles.

We claim as our invention:

1. In metallic bookstacks and analogous structures, a supporting frame structure comprising a row of spaced uprights, and a hollow metal member open along one side and extending horizontally lengthwise of said row of uprights and having an upright web rigidly secured to and connecting said uprights and forming a conduit for electric conductors and the like, flooring resting upon and supported by said hollow member, and said hollow member having a movable cover closing said open side thereof below said floor and which may be opened to afford access to said conduit from beneath said floor.

2. In metallic bookstacks and analogous structures having a main aisle and lateral aisles extending therefrom, upright supports arranged along said main aisle at each side thereof, a channel member extending horizontally along each side of said main aisle and having upright webs rigidly secured to and connecting the upright supports at said side of said aisle, said channels forming the sole structural connection between said uprights in that direction, and also forming conduits in which electrical conductors and the like may be arranged, and electrical conduit pipes secured at their ends to and supported by said upright webs of said channel members and extending therefrom along said lateral aisles for leading said conductors into said lateral aisles.

3. In metallic bookstacks and analogous structures, a supporting frame structure comprising two rows of spaced uprights defining an aisle in said structure, a channel member extending lengthwise of each row and having an upright web rigidly secured to said uprights with the open, upright side of said channel member facing said aisle and forming a combined structural member for said frame and a conduit for electrical conductors, cover plates detachably secured over the open sides of said channel members and facing into said aisles, and lighting fixtures secured to and removable with said cover plates and which extend into said aisles and have connection with said conductors in said channel.

4. In metallic bookstacks and analogous structures, a supporting frame structure comprising two rows of spaced uprights defining an aisle in said structure, a channel member extending lengthwise of each row and rigidly secured to said uprights with its open side facing said aisle, and horizontal connecting members extending across said aisle and having their ends entering said channel members and rigidly secured thereto, said channel members being deeper than said cross connecting members and forming uninterrupted conduits extending beneath said cross connecting members.

5. In metallic bookstacks and analogous structures, a supporting frame structure comprising parallel rows of spaced uprights, a hollow metallic member extending horizontally lengthwise of each row of uprights and rigidly secured to and connecting said uprights, and horizontal connecting members extending cross-wise between and rigidly secured at their ends in said hollow members, said hollow members being deeper than said cross connecting members and forming uninterrupted conduits extending beneath said cross connecting members.

6. In metallic bookstacks and analogous structures, a supporting frame structure comprising parallel rows of spaced uprights defining aisles in said structure, a plurality of channel members which extend horizontally lengthwise of said rows of uprights and having upright webs engaging and rigidly secured to the sides thereof at different elevations to define superposed tiers, flooring for each tier supported upon the horizontal flanges of said channels and running lengthwise of said aisles, said channels each forming a conduit for the reception of conductors and the like, and each having its upright open side facing into an aisle below said flooring, and cover plates closing the open sides of said hollow members and which are accessible for removal to facilitate insertion or removal of said conductors from an aisle below any floor without disturbance to said floor.

7. In metallic bookstacks and analogous structures, a supporting frame structure comprising a row of spaced uprights, and a channel member arranged on its side and extending horizontally lengthwise of said row of uprights and having an upright web abutting against and rigidly secured to the sides of and connecting said uprights and forming an open laterally facing sided conduit for electric conductors and the like, flooring supported upon the top flange of said channel, a cover plate extending lengthwise of and connecting the flanges of said channel and across said lateral open face which is removable to afford sidewise access to the conductors in said conduit from below and without disturbing said flooring.

8. In metallic bookstacks and analogous structures, a supporting frame structure comprising a row of spaced uprights, a horizontal channel member arranged with its web in a vertical plane abutting and rigidly secured to each row of and connecting the uprights therein and having the edges of its horizontal flanges defining an upright opening, horizontal cross members having their ends extending into said opening and secured to said channel member, said channel member being deeper than said cross members and forming a continuous conduit extending beneath said cross members, and detachable vertical cover plates extending lengthwise of said channel member and connecting said edges of said flanges, and each cover plate being of a length to extend between and engage at their ends with two adjacent cross members, whereby said cover plates together form a sectional closure for said continuous conduit.

JOHN G. L. SKAR.
CARL A. JOHNSON.